United States Patent [19]

Kawano

[11] Patent Number: 4,908,818
[45] Date of Patent: Mar. 13, 1990

[54] MULTIPLEX COMMUNICATION ARRANGEMENT CAPABLE OF SELECTIVELY MONITORING ACTIVE MULTIPLEXERS AND OF SIMULTANEOUSLY CHECKING AN INPUT TO A STAND-BY DEMULTIPLEXER

[75] Inventor: Osamu Kawano, Tokyo, Japan
[73] Assignee: NEC Corporation, Japan
[21] Appl. No.: 66,940
[22] Filed: Jun. 25, 1987

[30] Foreign Application Priority Data
Jun. 25, 1986 [JP] Japan ................................. 61-147045

[51] Int. Cl.⁴ .............................................. H04J 3/14
[52] U.S. Cl. ..................................................... 370/15
[58] Field of Search ...................... 370/15, 13, 77, 112; 371/22, 24

[56] References Cited

U.S. PATENT DOCUMENTS 4,160,877  7/1979  Vander Mey ........................ 370/112
4,601,028  7/1986  Huffman et al. ..................... 370/15
4,631,719 12/1986  Huffman et al. ..................... 370/15

Primary Examiner—Douglas W. Olms
Attorney, Agent, or Firm—Ostrolenk, Faber, Gerb & Soffen

[57] ABSTRACT

In a multiplex communication arrangement of an N:1 redundancy configuration, each multiplexer comprises a multiplexing circuit for multiplexing a plurality of multiplexer input signals into a multiplexed signal and an encoder for encoding the multiplexed signal into an encoded signal of self-checking codes, such as the known CRC codes. Into a decoder output signal, a decoder of each demultiplexer decodes a demultiplexer input signal which is in a form of the self-checking codes. As a selected signal, a selector selects one of the decoder output signal and the multiplexed signal produced in one of the multiplexers, (N+1) in number, that the selector selects as a selected multiplexer. A demultiplexing circuit demultiplexes the selected signal into a plurality of demultiplexer output signals. A bit-by-bit comparator compares the multiplexer input signal of the selected multiplexer with the demultiplexer output signals which are produced in one of the demultiplexers, (N+1) in number, for the multiplexed signal produced in the selected multiplexer. Inasmuch as such demultiplexer produces the demultiplexer output signals for a utilization device when the demultiplexer in question is an active one, it follows that the above-mentioned one of the demultiplexers is a stand-by one.

4 Claims, 2 Drawing Sheets

MULTIPLEX COMMUNICATION ARRANGEMENT CAPABLE OF SELECTIVELY MONITORING ACTIVE MULTIPLEXERS AND OF SIMULTANEOUSLY CHECKING AN INPUT TO A STAND-BY DEMULTIPLEXER

BACKGROUND OF THE INVENTION

This invention relates to a multiplex communication arrangement which is of an N:1 redundancy configuration and in which a stand-by demultiplexer is used to selectively monitor N active multiplexers as a part of a monitoring circuit for the multiplexers. Such a multiplex communication arrangement is said in the art to be capable of carrying out self-monitoring or self-diagnosis and is reliably operable.

In the manner which will later be described more in detail, a conventional multiplex communication arrangement of the above-described type comprises (N+1) multiplexers connected to a plurality of transmission channels or routes, respectively. Each transmission channel corresponds to a respective multiplexer. The arrangement further comprises (N+1) demultiplexers, each connected to a selector or switching device which is connected in turn to one of a plurality of reception channels that corresponds to the selector and consequently to the demultiplexer under consideration.

N multiplexers of the (N+1) multiplexers are used at any time as active multiplexers. Each active multiplexer multiplexes a plurality of multiplexer input signals into a single multiplexer output signal for transmission to one of the transmission channels that corresponds to the multiplexer in question and is used as an active transmission channel. The one remaining multiplexer is used as a stand-by multiplexer and is connected to one of the transmission channels that corresponds to the stand-by multiplexer and is used as a stand-by transmission channel.

N demultiplexers are used at any time as active demultiplexers They are connected to N reception channels, respectively, which are used as active reception channels. The one remaining demultiplexer is used as a stand-by demultiplexer and is connected to the one remaining reception channel that is used as a stand-by reception channel. The N selectors associated with the active demultiplexers connect those demultiplexers to the corresponding active reception channels. The remaining selector connects the stand-by demultiplexer, not to the stand-by reception channel, but to one of the active transmission channels that is selected as a selected transmission channel and is supplied with the multiplexer output signal as a selected multiplexer output signal. Each active demultiplexer demultiplexes a demultiplexer input signal received through its corresponding reception channel and its associated selector to generate a plurality of demultiplexer output signals. Similarly, the stand-by demultiplexer demultiplexes the selected multiplexer output signal into a plurality of demultiplexer output signals.

A comparator carries out bit by bit comparison of the demultiplexer output signals of the stand-by demultiplexer with the multiplexer input signals supplied to one of the multiplexers that is connected to the selected transmission channel. In this manner, the combination of the stand-by demultiplexer and the comparator serves as a monitoring circuit for selectively monitoring the active multiplexers. It is to be noted, as described above, that the stand-by reception channel is not connected to the stand-by demultiplexer. The stand-by demultiplexer is therefore incapable of receiving a signal which would otherwise be supplied thereto through the stand-by reception channel. As a result, multiplex communication arrangement is incapable of detecting errors present in the signal on the stand-by reception channel.

SUMMARY OF THE INVENTION

It is therefore an object of the present invention to provide a multiplex communication arrangement which is of an N:1 redundancy configuration and has a higher reliability than a conventional multiplex communication arrangement of the type described.

It is another object of this invention to provide a multiplex communication arrangement of the type described, which is capable of selectively monitoring N active multiplexers and of simultaneously checking an input signal located on a stand-by reception channel.

Other objects of this invention will become clear as the description proceeds.

According to this invention, there is provided a multiplex communication arrangement which is of an N:1 redundancy configuration where N represents a predetermined natural number and which comprises: (1) (N+1) multiplexers each being connected to a corresponding transmission channels, each multiplexer comprising a multiplexing circuit for multiplexing a plurality of multiplexer input signals into a multiplexed signal and an encoder for encoding the multiplexed signal into an encoded signal of self-checking codes for transmission to one of the transmission channels that corresponds to the multiplexer under consideration; (2) a plurality of demultiplexers, (N+1) in number, for connection to a plurality of reception channels corresponding to the respective demultiplexers, each demultiplexer comprising: (2a) a decoder for decoding a demultiplexer input signal into a decoder output signal, the demultiplexer input signal being in a form of the self-checking codes and being received through one of the reception channels that corresponds to the demultiplexer under consideration; (2b) a selector for selecting, as a selected signal, one of the decoder output signal and the multiplexed signal produced in one of the multiplexers that the selector selects as a selected multiplexer; and (2c) a demultiplexing circuit for demultiplexing the selected signal into a plurality of demultiplexer output signals; and (3) a comparator for carrying out bit by bit comparison of the multiplexer input signals of the selected multiplexer with the demultiplexer output signals which are produced from one of the demultiplexers for the multiplexed signal produced in the selected multiplexer.

For use in each demultiplexing circuit, each multiplexed signal should preferably be accompanied by a synchronizing signal. Similarly, each decoder should preferably establish synchronism of the demultiplexer input signal to make a like synchronizing signal accompany the decoder output signal. More preferably, each decoder should carry out error detection on the demultiplexer input signal with reference to the self-checking codes which are typically the CRC (cyclic redundancy check) codes known in the art.

DESCRIPTION OF THE PREFERRED EMBODIMENT

Figure 1:
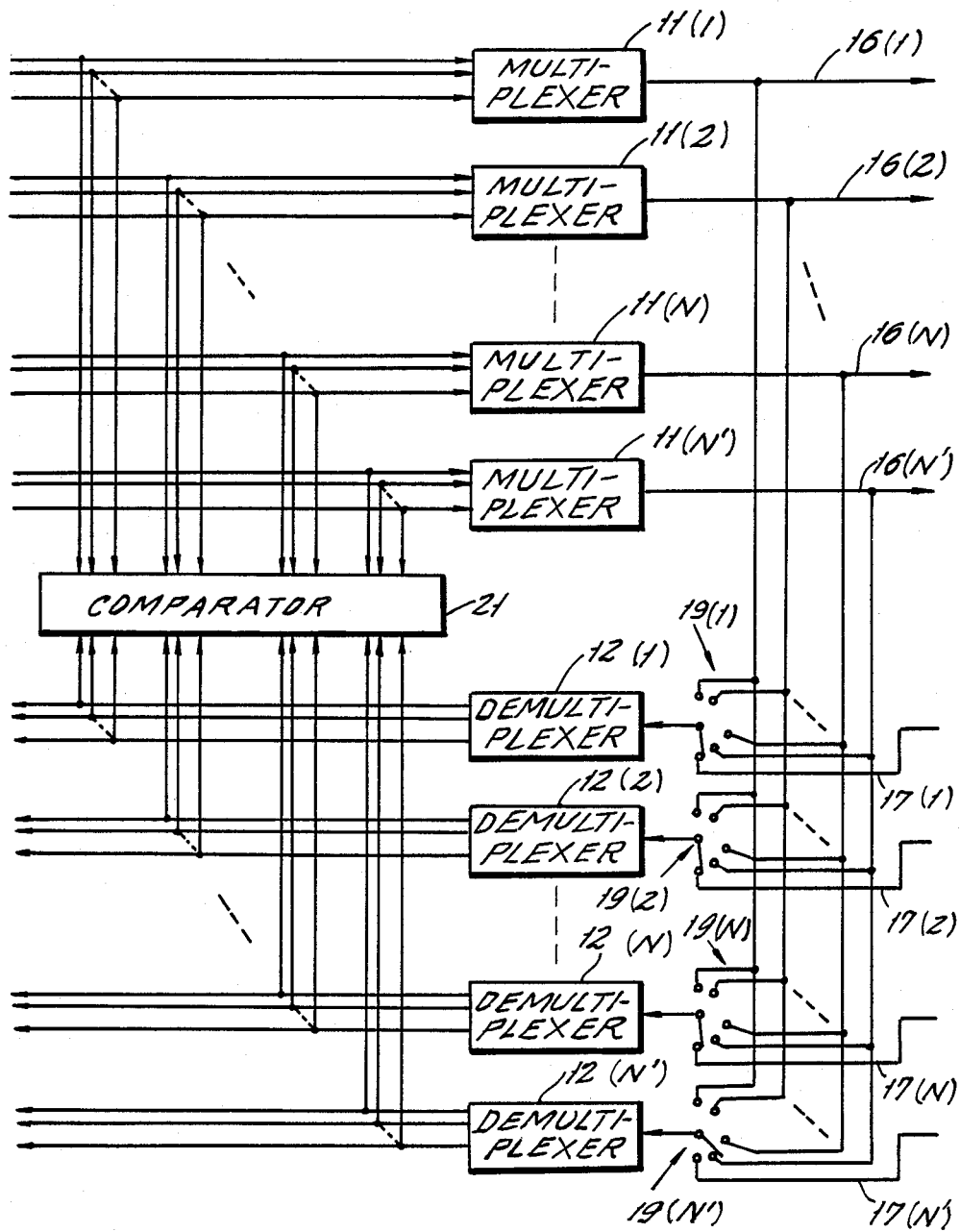
FIG. 1 is a block diagram of a conventional multiplex communication arrangement.

Referring to FIG. 1, a conventional multiplex communication arrangement will first be described in order to facilitate an understanding of the present invention. The arrangement is of an N:1 redundancy configuration and is capable of carrying out self-monitoring or self-diagnosis so that the arrangement is reliably operable in a multiplex communication network. The letter N represents a predetermined natural number which is typically equal to ten in the manner known in the art.

The multiplex communication arrangement comprises first through (N+1)-th multiplexers 11(1), 11(2), ..., 11(N), and 11(N'), referred to generally as multiplexers 11, and first through (N+1)-th demultiplexers 12(1), 12(2), ..., 12(N), and 12(N'), referred to generally as demultiplexers 12. Each multiplexer 11 is connected to a respective transmission channels or routes 16(1), 16(2), ..., 16(N), and 16(N'), referred to generally as channels 16. Similarly, each demultiplexer 12 is connected to a respective reception channel 17(1), 17(2), ..., 17(N), and 17(N'), referred to generally as channels 17, correspond via a respective selector or switching device 19(1), 19(2), ..., 19(N), and 19(N'), referred to generally as selectors 19. Each of the selectors 19 is also connected to all of the transmission channels 16.

N multiplexers of the multiplexers 11 are used at any time as active multiplexes. The remaining multiplexer is used as a stand-by multiplexer. Correspondingly, N transmission channels are active transmission channels and the transmission channel is, a stand-by transmission channel. N demultiplexers are used at time as active demultiplexers and the remaining demultiplexer is used as a stand-by demultiplexer. Those reception channels 17 which correspond to the respective active demultiplexers are active reception channels. The remaining reception channel is a stand-by reception channel. Any selector 19 which connects an active demultiplexer to an active or stand-by transmission channel 16 are active selectors. The selector 19 connecting the stand-by demultiplexer to the active and the stand-by transmission channels, is an inactive selector 19.

It will be assumed for convenience of description that the multiplexer 11(N'), the demultiplexer 12(N'), the transmission channel 16(N'), the reception channel 17(N'), and the selector 19(N') are stand-by ones. Other multiplexers 11(i), demultiplexers 12(i), transmission channels 16(i), reception channels 17(i), and selectors 19(i) are active ones (where i represents either one or all of the numerals 1 through N depending on the context). In the known manner, the active selectors 19(i) are used to connect the active demultiplexers 12(i) to the corresponding active reception channels 17(i), respectively, and to none of the transmission channels 16. In contrast, the stand-by selector 19(N') connects the stand-by demultiplexer 12(N') to that one of the transmission channels 16 that the stand-by selector 19(N') selects as a selected transmission channel.

Each active multiplexer 11(i) multiplexes a plurality of multiplexer input signals of a lower order into a multiplexed output signal of a higher order. Each multiplexed output signal is transmitted to the corresponding active transmission channel 16(i). Signals are transmitted to the active demultiplexers 12(i) through the active reception channels 17(i) and through the active selectors 19(i) as demultiplexer input signals. Each active demultiplexer 12(i) demultiplexes its demultiplexer input signal into a plurality of demultiplexed output signals. Even if a signal were transmitted towards the stand-by demultiplexer 12(N') through the stand-by reception channel 17(N') and through the stand-by selector 19(N'), the signal is neither received by the stand-by demultiplexer 12(N') nor demultiplexed into the demultiplexed output signals. Instead, the stand-by demultiplexer 12(N') demultiplexes the multiplexer output signal transmitted to the selected transmission channel from one of the active multiplexers 11(i) that is connected to the selected transmission channel into the demultiplexed output signals.

The conventional multiplex communication arrangement further comprises a comparator 21 which is operable in the manner known in the art. More particularly, the comparator 21 is supplied with the multiplexer input signals of the active multiplexers 11(i) and with the demultiplexed output signals of the active and the stand-by demultiplexers 12. The comparator 21 carries out a bit by bit comparison of the demultiplexed output signals of the stand-by demultiplexer 12(N') with the multiplexer input signals supplied to one of the active multiplexers 11(i) that is connected to the selected transmission channel. The comparator 21 thereby delivers a failure indication signal to a comparator output lead (not shown) when a failure is found in whichever of the active multiplexers 11(i) that is connected to the selected transmission channel selected by the stand-by selector 19(N'). In this manner, a combination of the stand-by selector 19(N'), the stand-by demultiplexer 12(N'), and the comparator 21 serves as a monitoring circuit for selectively monitoring the active multiplexers 11(i).

It should be noted in connection with the foregoing that the stand-by multiplexer 11(N') is put into operation as a new active multiplexer together with the corresponding transmission channel 16(N') whenever a failure is detected in any one of the multiplexers 16(i) that was used as an active multiplexer before detection of the failure. The comparator 21 is therefore connected to those input signal leads of the stand-by multiplexer 11(N') to which the multiplexer input signals are transferred from input signal leads of the active multiplexer 11(i) subjected to the failure. At any rate, the stand-by demultiplexer, exemplified at 12(N'), can not detect the signal which might be delivered towards the demultiplexer under consideration through the corresponding one of the active and the stand-by reception channels 17. The monitoring circuit is incapable of detecting errors which occur in the signal delivered towards the stand-by demultiplexer, such as the demultiplexer 12(N')(i.e., the signal on line 17(N')). It should furthermore be noted that all of the input signal leads of each of the multiplexers 11 need not necessarily be supplied with the multiplexer input signals, respectively. In other words, the number of the multiplexer input signals may or may not be less than that of the input signal leads. The same applies to the demultiplexers 12.

Figure 2:
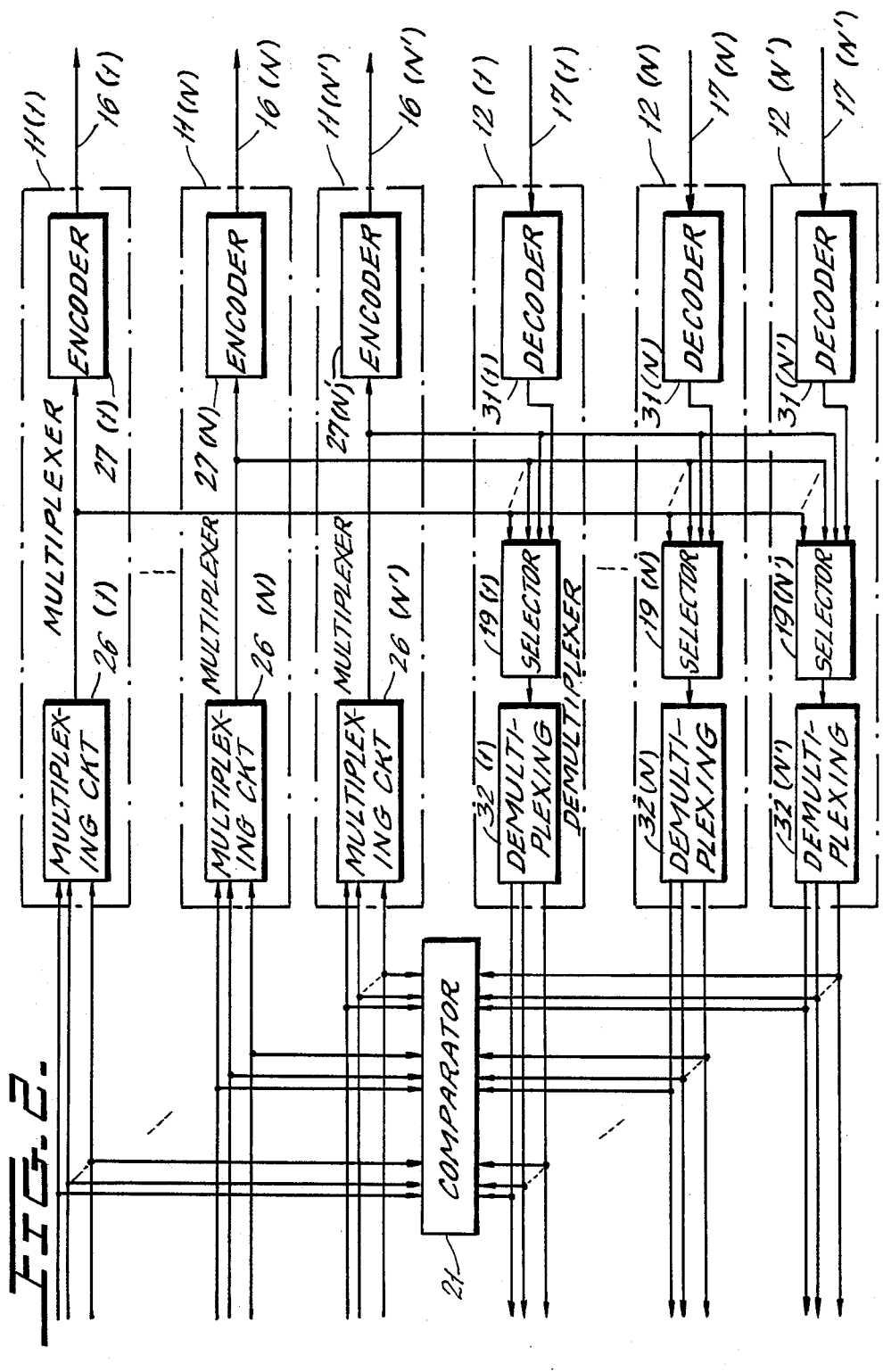
FIG. 2 is a block diagram of a multiplex communication arrangement according to an embodiment of the instant invention.

A multiplex communication arrangement according to a preferred embodiment of this invention will now be described with reference to FIG. 2. The arrangement is used in a multiplex communication network like the conventional multiplex communication arrangement and comprises similar parts which are designated by like reference numerals and are likewise operable. It should be noted, however, that the selectors 19 are included in the respective demultiplexers 12 in the manner which will presently be described. The demultiplexers 12 are therefore connected directly to the corresponding reception channels 17, respectively. In the manner described above, a notation N will be used in representing a predetermined natural number which is typically equal to ten in the known manner.

The first through the (N+1)-th multiplexers 11 comprise a similar number of multiplexing circuits 26(1), 26(2), ..., 26(N), and 26(N'), referred to generally as multiplexing circuits 26, and a plurality of encoders 27(1), 27(2), ..., 27(N), and 27(N'), referred to generally as encoders 27, respectively. Besides the respective selectors 19, the first through the (N+1)-th demultiplexers 12 comprise a like number of decoders 31(1), 31(2), ..., 31(N), and 31(N'), referred to generally as decoders 31, and a plurality of demultiplexing circuits 32(1), 32(2), ..., 32(N), and 32(N'), referred to generally as demultiplexing circuits 32, respectively. For simplicity of illustration, those parts are not depicted which are designated by the reference numerals with suffixes 2 through (N−1).

Responsive to the multiplexer input signals of the type described above, the multiplexing circuit 26(i) of each multiplexer 11(i) produces a multiplexed signal where i may be representative also of the suffix N' for the time being. In practice, the multiplexed signal is accompanied by a synchronizing signal. Only one output signal lead is, however, depicted for each multiplexing circuit 26(i) for simplicity of illustration. The encoder 27(i) of each multiplexer 11(i) encodes the multiplexed signal into an encoded signal of self-checking or error-detecting codes which are typically the CRC (cyclic redundancy check) codes known in the art. The encoded signal is transmitted to the corresponding transmission channel 16(i). Like the multiplexed output signal of each multiplexer 11(i) described in connection with FIG. 1, the multiplexed signal is delivered to the selectors 19 of the respective demultiplexers 12 together with the synchronizing signal.

The decoder 31(i) of each demultiplexer 12(i) is supplied with the demultiplexer input signal directly through its corresponding reception channel 17(i). It is to be noted here that the demultiplexer input signal is sent to the arrangement being illustrated through the reception channel 17(i) from a counterpart multiplex communication arrangement (not shown) and is an encoded signal in a form of the self-checking codes which are used in the encoded signals produced by the respective multiplexers 11 being illustrated. In the known manner, the decoder 31(i) establishes frame synchronism of the demultiplexer input signal and concurrently carries out error self-check, such as CRC, to produce a decoded output signal. In practice, the decoded output signal is accompanied by a synchronizing signal. As with each multiplexing circuit 26(i), only one output signal lead is depicted for each decoder 31(i) for simplicity of illustration. The decoder output signal and the accompanying synchronizing signal are delivered to the selector 19(i) of the demultiplexer 12(i) under consideration.

It will again be assumed that the multiplexer 11(N'), the demultiplexer 12(N'), the transmission channel 16(N'), and the reception channel 17(N') are used as stand-by ones. At this instant of time, other multiplexers 11(i), demultiplexers 12(i), transmission channels 16(i), and reception channels 17(i) are active ones.

The selector 19(i) of each active demultiplexer 12(i) is used to select the decoded output signal (and the accompanying synchronizing signal) produced by the decoder 31(i) of the demultiplexer 12(i) under consideration (not the multiplexed signals (and the accompanying synchronizing signals) produced in the respective active multiplexers 11(i)). The selector 19(i) thereby supplies the demultiplexing circuit 32(i) of that demultiplexer 12(i) with the decoded output signal as a selected signal. Using the accompanying synchronizing signal, the demultiplexing circuit 32(i) demultiplexed output signals, which are delivered to and used in a utilization device (not shown) of the demultiplexer 12(i) in question in the known manner.

Like the stand-by selector 19(N') described in conjunction with FIG. 1, the selector 19(N') of the stand-by demultiplexer 12(N') is used to select the multiplexed signal (and the accompanying synchronizing signal) produced in one of the active multiplexers 11(i) that the selector 19(N') in question selects any given instant as a selected multiplexer. The selector 19(N') thereby supplies the demultiplexing circuit 32(N') of the stand-by demultiplexer 12(N') with the selected signal that is the multiplexed signal produced in the selected multiplexer. Using the accompanying synchronizing signal, the demultiplexing circuit 32(N') demultiplexes the selected signal into a plurality of demultiplexed output signals, which are delivered to the comparator 21 in the known manner and which are identical with the multiplexer input signals of the selected multiplexer so long as no failure or defect is present at least in the multiplexing circuit 26(i) of the selected multiplexer.

It is now understood that a combination of the selector 19(N') of the stand-by demultiplexer 12(N') and the comparator 21 is capable of selectively monitoring the multiplexing circuits 26(i) of the active multiplexers 11(i) among others. In the meantime, the decoder 31(N') of the stand-by demultiplexer 12(N') detects a signal which might arrive at the stand-by demultiplexer 12(N') through the corresponding reception channel 17(N'). In addition, the decoders 31 (suffixes omitted) of the active and the stand-by demultiplexers 12 are capable of error-checking the demultiplexer input signals supplied thereto through the respective reception channels 17.

What is claimed is:

1. A multiplex communication arrangement which comprises:
   (A) N+1 multiplexers, N being a positive integer greater than 1, each multiplexer being for connection to a respective transmission channel and comprising a multiplexing circuit for multiplexing a plurality of multiplexer input signals applied thereto into a multiplexed signal and an encoder for encoding said multiplexed signal into an encoded signal of self-checking codes for transmission to its respective said transmission channel;
   (B) N+1 demultiplexers each for connection to a respective reception channel, each demultiplexer comprising:
      (1) a decoder for decoding a demultiplexer input signal applied thereto into a decoder output signal, said demultiplexer input signal being in a form of said self-checking codes and being received through its respective reception channel, said decoder checking for errors in said demultiplexer input signal applied thereto;

(2) a selector for selecting, as a selected signal, one of said decoder output signal and the multiplexed signal produced by one of said multiplexers that said selector selects as a selected multiplexer; and (3) a demultiplexing circuit for demultiplexing said selected signal into a plurality of demultiplexer output signals; and (C) a comparator for carrying out bit by bit comparison of the multiplexer input signals of said selected multiplexer with the demultiplexer output signals which are produced from one of said demultiplexers for the multiplexed signal produced in said selected multiplexer.

2. A multiplex communication arrangement as claimed in claim 1, the multiplexed signal being produced in each multiplexer together with a first synchronizing signal, the decoder output signal being produced in each demultiplexer together with a second synchronizing signal, wherein the demultiplexing circuit of each demultiplexer is for demultiplexing the selected signal into the demultiplexer output signals with reference to said first and said second synchronizing signals when the selected signal is the multiplexed and the decoder output signals, respectively.

3. A multiplex communication arrangement as claimed in claim 2, wherein the decoder of each demultiplexer is furthermore for establishing synchronism of the demultiplexer input signal and for carrying out error detection on the demultiplexer input signal with reference to said self-checking codes.

4. A multiplex communication arrangement as claimed in claim 3, wherein said one of the demultiplexers is a stand-by demultiplexer when the selector thereof selects said selected multiplexer.

* * * * *